United States Patent
Svinth et al.

(10) Patent No.: US 9,933,931 B2
(45) Date of Patent: Apr. 3, 2018

(54) FREEZE PANE WITH SNAP SCROLLING

(71) Applicant: Microsoft Technology Licensing, LLC, Redmond, WA (US)

(72) Inventors: Michael Helligsø Svinth, Taastrup (DK); Adriana Horina Serbanescu Dale, Birkerød (DK); Jacob Winther Jespersen, Copenhagen (DK)

(73) Assignee: Microsoft Technology Licensing LLC, Redmond, WA (US)

( * ) Notice: Subject to any disclaimer, the term of this patent is extended or adjusted under 35 U.S.C. 154(b) by 275 days.

(21) Appl. No.: 14/747,598

(22) Filed: Jun. 23, 2015

(65) Prior Publication Data

US 2016/0378326 A1    Dec. 29, 2016

(51) Int. Cl.
*G06F 3/0485* (2013.01)
*G06F 3/0488* (2013.01)
*G06F 3/0482* (2013.01)
*G06F 3/0484* (2013.01)
*G06F 17/24* (2006.01)

(52) U.S. Cl.
CPC ........ *G06F 3/04855* (2013.01); *G06F 3/0482* (2013.01); *G06F 3/0485* (2013.01); *G06F 3/0488* (2013.01); *G06F 3/04845* (2013.01); *G06F 3/04883* (2013.01); *G06F 17/246* (2013.01)

(58) Field of Classification Search
CPC .............. G06F 3/04883; G06F 3/0485; G06F 3/04845; G06F 3/0482; G06F 17/246; G06F 3/0488; G06F 3/04855
See application file for complete search history.

(56) References Cited

U.S. PATENT DOCUMENTS

| | | | |
|---|---|---|---|
| 6,988,241 B1* | 1/2006 | Guttman | G06F 17/246 707/E17.115 |
| 7,584,416 B2 | 9/2009 | Beran et al. | |
| 7,673,227 B2* | 3/2010 | Kotler | G06F 17/211 715/209 |
| 7,703,133 B1* | 4/2010 | Balasubramanian | G06F 3/0481 713/164 |
| 7,779,346 B2 | 8/2010 | Buczek | |
| 8,640,022 B2* | 1/2014 | Waldman | G06F 17/246 715/210 |
| 2001/0012025 A1* | 8/2001 | Wojaczynski | G06F 3/0485 715/856 |
| 2008/0082938 A1* | 4/2008 | Buczek | G06F 17/246 715/784 |

(Continued)

FOREIGN PATENT DOCUMENTS

WO    WO 99/04561 A1    1/1999

OTHER PUBLICATIONS

"Freeze Panes like Excel", Published on: Mar. 1, 2008 Available at; http://www.codeproject.com/Articles/20017/Freeze-Panes-like-Excel.

(Continued)

*Primary Examiner* — Aaron Lowenberger
(74) *Attorney, Agent, or Firm* — Christopher J. Volkmann; Kelly, Holt & Christenson, PLLC

(57) ABSTRACT

A grid structure has a header section and a content section. A scroll user input is detected and columns in the content section are scrolled without scrolling the header section. The displayed grid structure is snapped to a column boundary.

17 Claims, 13 Drawing Sheets

(56) References Cited

U.S. PATENT DOCUMENTS

| | | | |
|---|---|---|---|
| 2009/0144607 A1* | 6/2009 | Chen | G06F 17/30905 715/227 |
| 2009/0313537 A1 | 12/2009 | Fu et al. | |
| 2010/0205520 A1* | 8/2010 | Parish | G06F 17/246 715/212 |
| 2011/0252299 A1* | 10/2011 | Lloyd | G06F 17/246 715/212 |
| 2011/0289397 A1 | 11/2011 | Eastmond et al. | |
| 2012/0036455 A1* | 2/2012 | Holt | G06F 3/0482 715/753 |
| 2012/0089914 A1* | 4/2012 | Holt | G06F 3/0485 715/728 |
| 2012/0151317 A1* | 6/2012 | Ho | G06F 17/211 715/217 |
| 2012/0192079 A1* | 7/2012 | Burk | G06F 3/0481 715/740 |
| 2013/0055061 A1* | 2/2013 | Ashley-Rollman | G06F 17/245 715/228 |
| 2013/0321282 A1* | 12/2013 | Chang | G06F 3/04883 345/173 |
| 2016/0026356 A1* | 1/2016 | Persaud | G06F 3/0485 715/212 |

OTHER PUBLICATIONS

"Table with fixed header and fixed column on pure css", Published on: Nov. 17, 2014 Available at: http://stackoverflow.com/questions/15811653/table-with-fixed-header-and-fixed-column-on-pure-css.

"Change table width animation", Retrieved on: May 25, 2015 Available at: http://stackoverflow.com/questions/8205901/change-table-width-animation.

Battagin, Dan, "We've Updated Excel Web App—What's New as of Jun. 2013?", Published on: Jun. 26, 2013 Available at: http://blogs.office.com/2013/06/26/weve-updated-excel-web-app-whats-new-as-of-june-2013-2/.

Scott, Peter, "Freezing panes in a 3.0 Web report", Published on: Oct. 2004 Available at: http://searchsap.techtarget.com/answer/Freezing-panes-in-a-30-Web-report.

"Jquery—Freeze HTML Table Header and the Left Columns", Published on: Apr. 8, 2013 Available at: http://eureka.ykyuen.info/2013/04/08/Auery-freeze-html-table-header-and-the-left-columns/.

Wright, Tony "How to create an HTML table with frozen headers and columns", Published on: May 30, 2009 Available at: http://hazaa.com.au/blog/how-to-create-an-html-table-with-frozen-headers-and-columns/.

Wiedower, Reed: "Ice Cold: Excel Web App Debuts Freezing and Snapping", Published on: Jun. 28, 2013 Available at: https://newsignature.com/articles/ice-cold-excel-web-app-debuts-freezing-and-snapping.

Ballard, Phil, "Freeze Rows and Columns in Google Sheets", Published on: Mar. 17, 2014 Available at: http://www.mousewhisperer.co.uk/drivebunny/freeze-rows-and-columns-in-google-sheets/.

"In CSS, how do I get a left-side fixed-width column with right-side table that uses the rest of the width?", Published on: Feb. 3, 2009 Available at: http://stackoverflow.com/questions/468038/in-css-how-do-i-get-a-left-side-fixed-width-column-with-a-right-side-table-that.

"HTML table headers always visible at top of window when viewing a large table", Published on: Jul. 3, 2009 Available at: http://stackoverflow.com/questions/1030043/html-table-headers-always-visible-at-top-of-window-when-viewing-a-large-table.

Narayanan, Jay, "Is there freeze pane functionality available with SAP BW 3.5?", Published on: Feb. 2006 Available at: http://searchsap.techtarget.com/answer/Is-there-freeze-pane-functionality-available-with-SAP-BW-35.

Kallala, Praveenreddy, "Freeze Panes in Web Application BI7.0", Published on: Jun. 23, 2009 Available at: http://scn.sap.com/thread/1385946.

International Search Report and Written Opinion for International Patent Application No. PCT/US2016/038281, dated Sep. 5, 2016, date of filing: Jun. 20, 2016, 14 pages.

* cited by examiner

Sales Order

Acme International Ltd.

⊕ new

| No. | Name | stomer No. | Location Code | Assigned User ID | Status | Sales Person Code | Campaign No. | Currency |
|---|---|---|---|---|---|---|---|---|
| 101005 | Company 1 | )0 | RED | A | Released | PS | | EU |
| 101009 | Company 2 | 18456 | RED | B | Released | JR | | EU |
| 101011 | Company 3 | 17129 | YELLOW | C | Released | JR | | SE |
| 101013 | Company 4 | 17889 | GREEN | D | Released | JR | | EU |
| 101015 | Company 5 | 13663 | BLUE | E | Released | PS | | |
| 101016 | Company 6 | )0 | YELLOW | F | Open | JR | | US |
| 101018 | Company 7 | 14545 | YELLOW | G | Released | JR | | EU |
| 101019 | Company 8 | 17987 | YELLOW | H | | JR | | |
| 101020 | Company 9 | 19456 | RED | I | Open | JR | | EU |
| 101022 | Company 10 | 18456 | | J | Open | | | EU |

FIG. 3B

| No. | Name | Location Code | Assigned User ID | Status | Sales Person Code | Campaign No. | Currency Code |
|---|---|---|---|---|---|---|---|
| 101005 | Company 1 | RED | A | Released | PS | | EUR |
| 101009 | Company 2 | RED | B | Released | JR | | EUR |
| 101011 | Company 3 | YELLOW | C | Released | JR | | SEK |
| 101013 | Company 4 | GREEN | D | Released | JR | | EUR |
| 101015 | Company 5 | BLUE | E | Released | PS | | |
| 101016 | Company 6 | YELLOW | F | Open | JR | | USD |
| 101018 | Company 7 | YELLOW | G | Released | JR | | EUR |
| 101019 | Company 8 | YELLOW | H | Open | JR | | EUR |
| 101020 | Company 9 | YELLOW | I | Open | JR | | EUR |
| 101022 | Company 10 | RED | J | | | | |

FIG. 3C

| No. | Name | Sell-To Customer No. | Location Code | Assigned User ID | Status | Sales Person Code | Campaign No. |
|---|---|---|---|---|---|---|---|
| 101005 | Company 1 | 30000 | RED | A | Released | PS | |
| 101009 | Company 2 | 38128456 | RED | B | Released | JR | |
| 101011 | Company 3 | 43687129 | YELLOW | C | Released | JR | |
| 101013 | Company 4 | 46897889 | GREEN | D | Released | JR | |
| 101015 | Company 5 | 49633663 | BLUE | E | Released | PS | |
| 101016 | Company 6 | 10000 | YELLOW | F | Open | JR | |
| 101018 | Company 7 | 01454545 | YELLOW | G | Released | JR | |
| 101019 | Company 8 | 31987987 | YELLOW | H | Open | JR | |
| 101020 | Company 9 | 32789456 | YELLOW | I | Open | JR | |
| 101022 | Company 10 | 38128456 | RED | J | Open | JR | |

FIG. 4A

HOME   ACTIONS   NAVIGATE   RESORT

Acme International Ltd.

Sales Order ⊕ new

| No. | Name | stomer No. | Location Code | Assigned User ID | Status | Sales Person Code | Campaign No. | Currency |
|---|---|---|---|---|---|---|---|---|
| 101005 | Company 1 | 90 | RED | A | Released | PS | | EU |
| 101009 | Company 2 | 8456 | RED | B | Released | JR | | EU |
| 101011 | Company 3 | 7129 | YELLOW | C | Released | JR | | SE |
| 101013 | Company 4 | 7889 | 245 GREEN | D | Released | JR | | EU |
| 101015 | Company 5 | 365 | BLUE | E | Released | PS | | |
| 101016 | Company 6 | 90 | YELLOW | F | Open | JR | | US |
| 101018 | Company 7 | 4545 | YELLOW | G | Released | JR | | EU |
| 101019 | Company 8 | 7987 | YELLOW | H | | JR | | |
| 101020 | Company 9 | 9456 | YELLOW | I | Open | JR | | EU |
| 101022 | Company 10 | 8456 | RED | J | Open | JR | | EU |

FIG. 4B

| Sales Order | | | | | | |
|---|---|---|---|---|---|---|
| Acme International Ltd. | | | | | | |
| ⊕ new | | | | | | |
| No. | Name | Location Code | Assigned User ID | Status | Sales Person Code | Campaign No. | Currency Code |
|---|---|---|---|---|---|---|---|
| 101005 | Company 1 | RED | A | Released | PS | | EUR |
| 101009 | Company 2 | RED | B | Released | JR | | EUR |
| 101011 | Company 3 | YELLOW | C | Released | JR | | SEK |
| 101013 | Company 4 | GREEN | D | Released | JR | | EUR |
| 101015 | Company 5 | BLUE | E | Released | PS | | |
| 101016 | Company 6 | YELLOW | F | Open | JR | | |
| 101018 | Company 7 | YELLOW | G | Released | JR | | USD |
| 101019 | Company 8 | YELLOW | H | | JR | | EUR |
| 101020 | Company 9 | YELLOW | I | Open | JR | | |
| 101022 | Company 10 | RED | J | Open | JR | | EUR |

FIG. 4C

FREEZE PANE WITH SNAP SCROLLING

BACKGROUND

Computer systems are currently in wide use. Some systems provide access to the computing system functionality, applications, and data, through a family of clients. In such systems, a user experience is often tailored to each device (or client).

As one example, an on-premise or cloud-based computing system may provide access to a desktop client device, a web-based client device, and a mobile client device. In addition, some of the client devices may be provided on multiple different platforms.

Some computing systems have many different forms (or user interface displays) that are generated and surfaced for a user who is using the computing system. One type of form or user interface display is a list page, or list view. In a list page, the display is surfaced with rows divided into columns. The rows have row headings and the columns have column headings. Content or data is displayed within the row and column grid structure. Such grid structures can sometimes be very large, so that the entire structure cannot be viewed on a single user interface display.

Some spreadsheet applications provide freeze panes. Freeze panes operate by freezing the first column on the left-hand side of the worksheet so that, while the user scrolls through the data, the row headers stay the same. However, when a list page is displayed, it is displayed on a web client or a mobile client as a set of HTML tables in a browser. Many current browsers do not implement any type of support for adding freeze pane functionality to HTML tables.

The discussion above is merely provided for general background information and is not intended to be used as an aid in determining the scope of the claimed subject matter.

SUMMARY

A grid structure has a header section and a content section. A scroll user input is detected and data columns in the content section are scrolled without scrolling the header section. The displayed grid structure is snapped to a column boundary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3C show examples of user interface displays on a client using a desktop browser.

FIGS. 4A-4C show examples of user interface displays on a client using a mobile browser.

DETAILED DESCRIPTION

Figure 1:
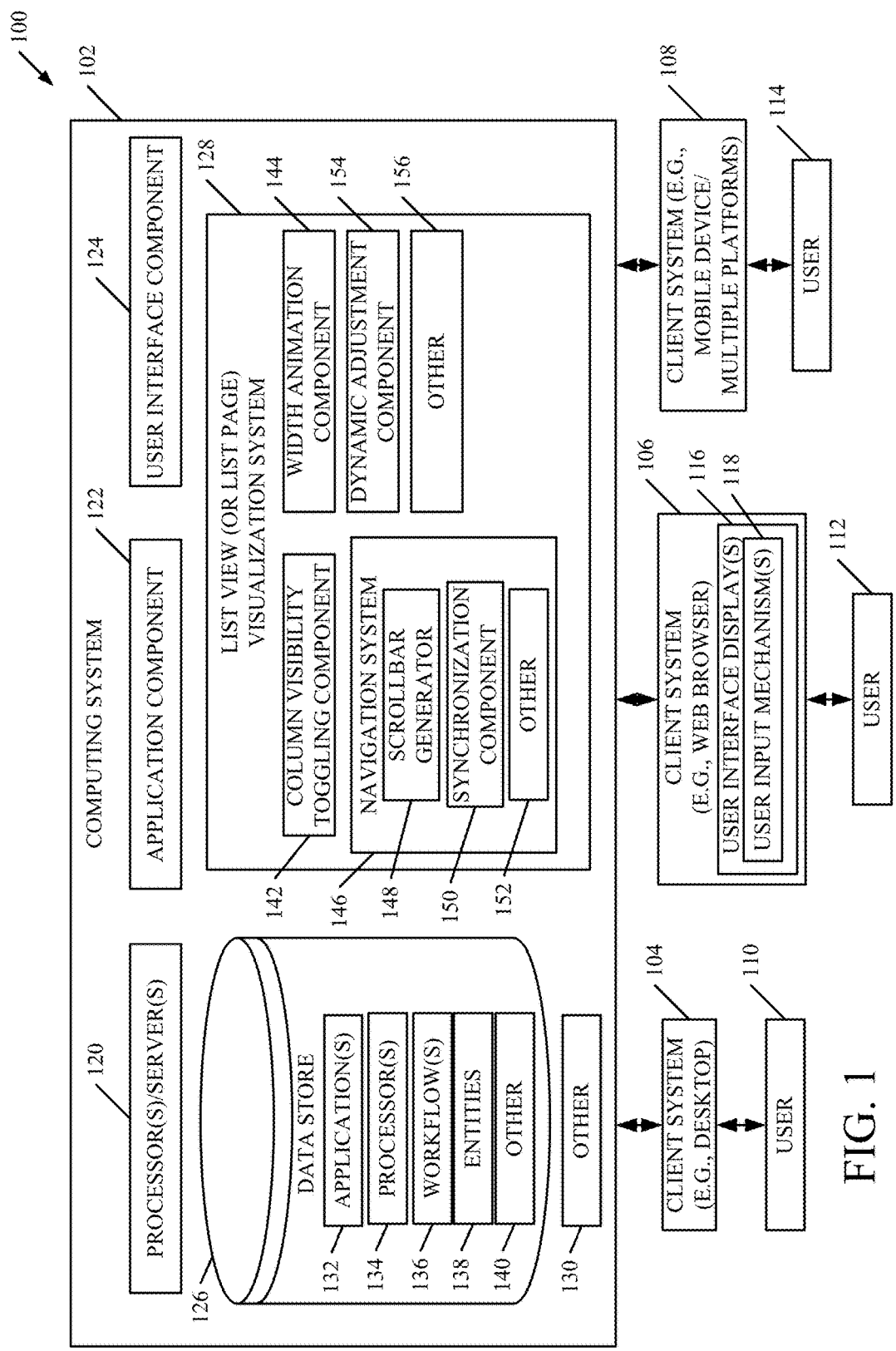
FIG. 1 is a block diagram of one example of a computing system architecture.

FIG. 1 is a block diagram of one example of a computing system architecture 100. Architecture 100 illustratively includes computing system 102 that is accessible by a plurality of different client systems. In the example shown in FIG. 1, computing system 102 is accessible by client system 104, which may be a desktop client. It may also be accessible by client system 106, which may access computing system 102 through a web browser. Further, system 102 may be accessible by client system 108, which may access computing system 102 through a mobile device browser, and it may do so on multiple different operating system platforms. Users 110, 112 and 114 illustratively access computing system 102 through the various client systems 104, 106 and 108.

In the example shown in FIG. 1, client system 106 illustratively generates user interface displays 116, with user input mechanisms 118. User 112 thus interacts with user input mechanisms 118 in order to control and manipulate computing system 102. It will be noted that client systems 104 and 108 may also illustratively generate user interface displays, with user input mechanisms, and they are shown only in client system 106, for the sake of example.

Computing system 102, itself, illustratively includes processors or servers 120, application component 122, user interface component 124, data store 126, list view (or list page) visualization system 128, and it can include a wide variety of other items 130. Data store 126 can include applications 132, processes 134, workflows 136, entities 138, and a wide variety of other information 140. Visualization system 128 illustratively includes column visibility toggling component 142, width animation component 144, navigation system 146 (which, itself, illustratively includes scroll bar generator 148, synchronization component 150, and it can include other items 152), dynamic adjustment component 154, and it can include other items 156.

By way of overview, application component 122 illustratively runs applications 132, to perform processes 134, workflows 136, etc. In doing so, it can operate on entities 138 or a wide variety of other data records 140. Entities 138 illustratively represent items within computing system 102. For instance, a vendor entity describes and represents a vendor. An invoice entity describes and represents an invoice. An email entity describes and represents an email message. A document entity describes and represents a document, etc. This is a small set of example entities, and a wide variety of other entities may be used in computing system 102 as well. User interface component 124, either under the control of application component 122 or visualization system 128, or on its own, illustratively surfaces information and components and various display elements that can be displayed on the user interface displays on the various clients 104-108.

List view visualization system 128 illustratively controls the visualization of list views, or list pages, where they are displayed using a markup language representation (such as an HTML representation). It illustratively displays the list page as a grid of rows separated into columns, with row headings and column headings. It surfaces the list page with freeze pane functionality so that, as a user is scrolling through the various columns of the list page, the column headings are scrolled along with the scrolled columns, while the row headings remain frozen. It also deploys snap functionality. By "snap functionality" it is meant that, as a user is scrolling through the various columns, the view will snap to a column boundary, before it comes to rest. Therefore, in one example, the user need not attempt to precisely scroll to a column boundary, but instead, the visualization system 128 will snap the visualization to a column boundary. This is discussed in greater detail below.

Figure 2:
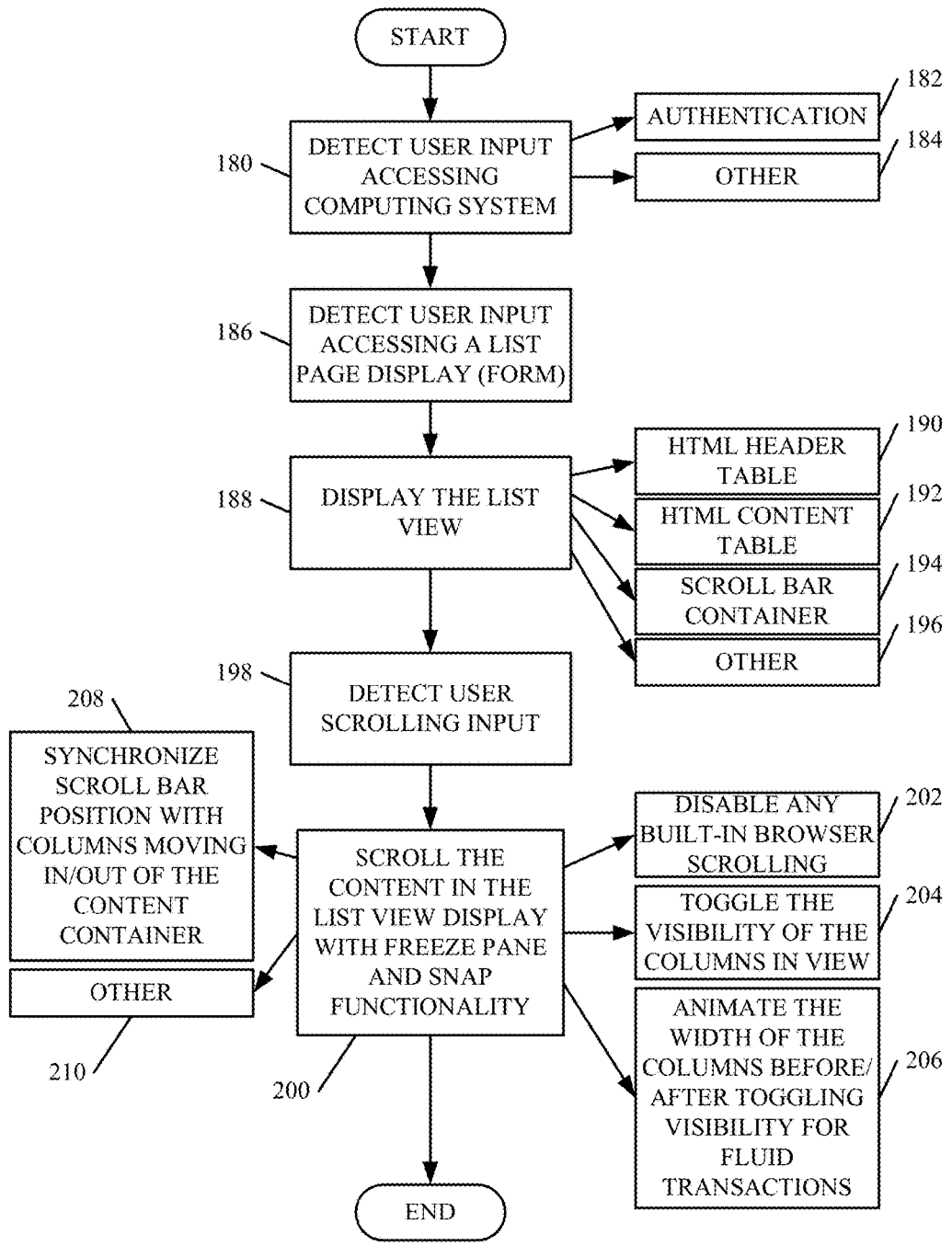
FIG. 2 is a flow diagram illustrating the operation of a visualization system shown in FIG. 1 is surfacing a list view or list page visualization.

FIG. 2 is a flow diagram illustrating one example of the operation of computing system 102 (and specifically list view visualization system 128) in surfacing a list view with freeze pane and snap functionality. Computing system 102 first detects a user input accessing the computing system 102. This is indicated by block 180 in FIG. 2. For purposes of the present discussion, it will be assumed that user 112 is accessing computing system 102 through a web browser. Therefore, user 112 may provide authentication information 182, or user 112 may access computing system 102 in other ways 184.

Computing system 102 (for instance, an application component 122 that is running one of applications 132) may then detect a user input indicating that user 112 wishes to access a list page display (such as a form that displays content in a grid). This is indicated by block 186. For instance, it may be that user 112 navigates to a list view by actuating a link to the list view from within an application. It may be that user 112 provides an input indicating that he or she wishes to view a list page in other ways as well.

List view visualization system 128 then displays the list view. This is indicated by block 188. In one example, the grid structure is broken down into two different tables. Also, in one example, the list view includes an additional container which shows a scroll bar, proximate the container containing the grid structure. The scroll bar container is indicated by block 194 in FIG. 2. Of course, the list view can include other items 196 as well.

Navigation system 146, in list view visualization system 128, then detects a user input indicating that the user wishes to scroll the list view. This is indicated by block 198 in FIG. 2. In the example being discussed, the user will provide an input moving the scroll bar in the scroll bar container, in one direction or another. In another example, the user provides the scrolling input using a touch gesture. This may be where, as will be described in greater detail below, the user is viewing the list view on a mobile device.

In response, list view visualization system 128 illustratively scrolls the content of the grid structure, while keeping the row header information (e.g., in the left most column or set of columns of the grid structure) frozen. It also implements snap functionality so that the visualization snaps to a column boundary during the scroll operation. Scrolling the content in the list view display with freeze pane and snap functionality is indicated by block 200.

This can be done in a variety of different ways. In one example, navigation system 146 first disables any built in browser scrolling functionality. This is indicated by block 202. Column visibility toggling component 142 then toggles the visibility of table columns in the grid structure, so that the user can move through more columns than would fit in the display real estate on the particular device that the client system is using. Toggling the visibility of the columns in view is indicated by block 204.

Width animation component 144 animates the width of the columns before and after the visibility is toggled. The width is animated during the scrolling operation so that the columns appear to slide over the top of one another, or slide off of the top of one another, depending on the particular direction of scrolling. The animation illustratively provides a relatively fast and fluid transition for the various columns that appear and disappear in the display real estate on the display device being used by the client system. Animating the width of the columns before and after toggling visibility to provide fluid transitions is indicated by block 206.

Synchronization component 150 synchronizes the scroll bar position of the scroll bar displayed in the scroll bar container, with the columns being animated in and out of the data container on the visualization. This gives the impression that the scroll bar belongs to the data container. Synchronizing scroll bar position with columns moving in and out of the content container is indicated by block 208 in FIG. 2. Of course, the scrolling can be performed in other ways as well, as indicated by block 210.

Figure 3A:

FIGS. 3A-3C show one set of example user interface displays that can be displayed, for example, by a web browser in a client system. FIG. 3A, for instance, illustrates a user interface display 220. Display 220 is illustratively a list view, or list page display of sales orders. It includes a grid structure 222 that is formed by a set of rows divided into columns. The columns, in the example shown in FIG. 3A, include a sales order number column 224, a customer name column 226, a sell-to customer number column 227, a location code column 228, an assigned user ID column 230, a status column 232 and a sales person code column 234.

Grid structure 222 also has a set of rows. The row header information is defined, in the example shown in FIG. 3A, as including the contents of sales order number column 224 and the customer name column 226. Grid structure 222 also illustratively includes scroll bar container 236. It is illustratively a separate markup language container displayed in close proximity to the grid structure 222. In one example, container 236 is visually added underneath the data container.

In order to scroll the grid view display, the user 236 illustratively selects the scroll bar 238 in scroll bar container 236 and moves it in the direction indicated by arrow 240. When this happens, synchronization component 150 synchronizes the position of scroll bar 238 with the data columns 228-234, that are displayed in the grid structure. Therefore, as the user moves scroll bar 238 in the direction indicated by arrow 240, the columns 228-234 move in the opposite direction within the content portion of the grid structure.

FIG. 3B shows one example of this. Some of the items shown in FIG. 3B are similar to those shown in FIG. 3A, and they are similarly numbered. However, it can be seen in FIG. 3B that the sell-to customer number column 227 has now been scrolled partially off of the content grid (or data grid), but the row header information set out in columns 224 and 226 has remained frozen. It can also be seen that a part of a previously unseen column (currency column 242) has now been scrolled onto the data grid structure from the right.

FIG. 3C is similar to FIG. 3B, and similar items are similarly numbered. However, it can now be seen that the visualization has snapped to the left most boundary of the assigned location code column 228. That is, the entire sell-to customer number column 227 has now been hidden, and the new visualization begins with column 228. In one example, this is done by having column visibility toggling component 142 turning off the visibility of column 227, as it is being scrolled off of the grid structure, and using the width animation component 144 to animate the width of the column (during its transition from visible to invisible) so that the width gives the impression of moving fluidly off of the content grid structure to the left, or so that the left most boundary of column 227 moves fluidly over the top of it, thus hiding it. In one example, as soon as the left most boundary of column 227 is moved so that it would cross the boundary of column 226, the visibility of column 227 is toggled off and the transition animation occurs. Therefore, this provides snap functionality, because the animation gives the visual appearance that the column is disappearing off to the left of the content grid structure (or being covered by columns to its right), and the visualization is snapping now to the left most boundary of column 228.

The same operation is generally true when the user moves scroll bar 238 in the opposite direction of arrow 240. In that case, the visibility of column 227 will again be turned on, and it will be animated during the transition of invisible to visible so that it gives the visual appearance of sliding onto the grid structure from the left to the right (or as being uncovered as the rest of the grid structure moves to the right). Again, the snap functionality will be obtained, because the animation will continue once the visibility of column 228 is toggled to visible.

As one example, the column animations in and out of the HTML table defining the content can be implemented by applying cascading style sheet (CSS) transitions on the width parameter, on the columns being moved in and out of the display real estate (the content grid structure on the user interface display). It can be achieved in other ways as well.

FIGS. 4A-4C are similar to FIGS. 3A-3C, except that they are shown on a mobile device. On the mobile device, instead of using a scroll bar, the user scrolls the content grid structure using a touch gesture (such as a swipe), as indicated by circle 245. Synchronization component 150, in that scenario, synchronizes the touch gesture with the columns being moved in and out of the view, instead of synchronizing the scroll bar position with the columns. This can be accomplished by two separate synchronization components 150 (one for scroll bar synchronization and another for touch gesture synchronization) or by a single synchronization component 150.

Dynamic adjustment component 154 illustratively generates configuration user interface displays that allow the user to configure and dynamically adjust the column or columns that are frozen. The user input mechanisms can include column selection mechanisms that allow the user to select which columns will be frozen during scrolling. It can also include other user input mechanisms that allow the user to select or configure those columns in other ways as well. When the user dynamically adjusts the columns that are to be frozen, they may be wider or narrower than other columns. Therefore, navigation system 146 takes this into account in generating the scroll bar display element and synchronization component 150 also takes this into account in synchronizing the scroll bar position (or touch gesture) with the columns being moved in and out of the display real estate.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
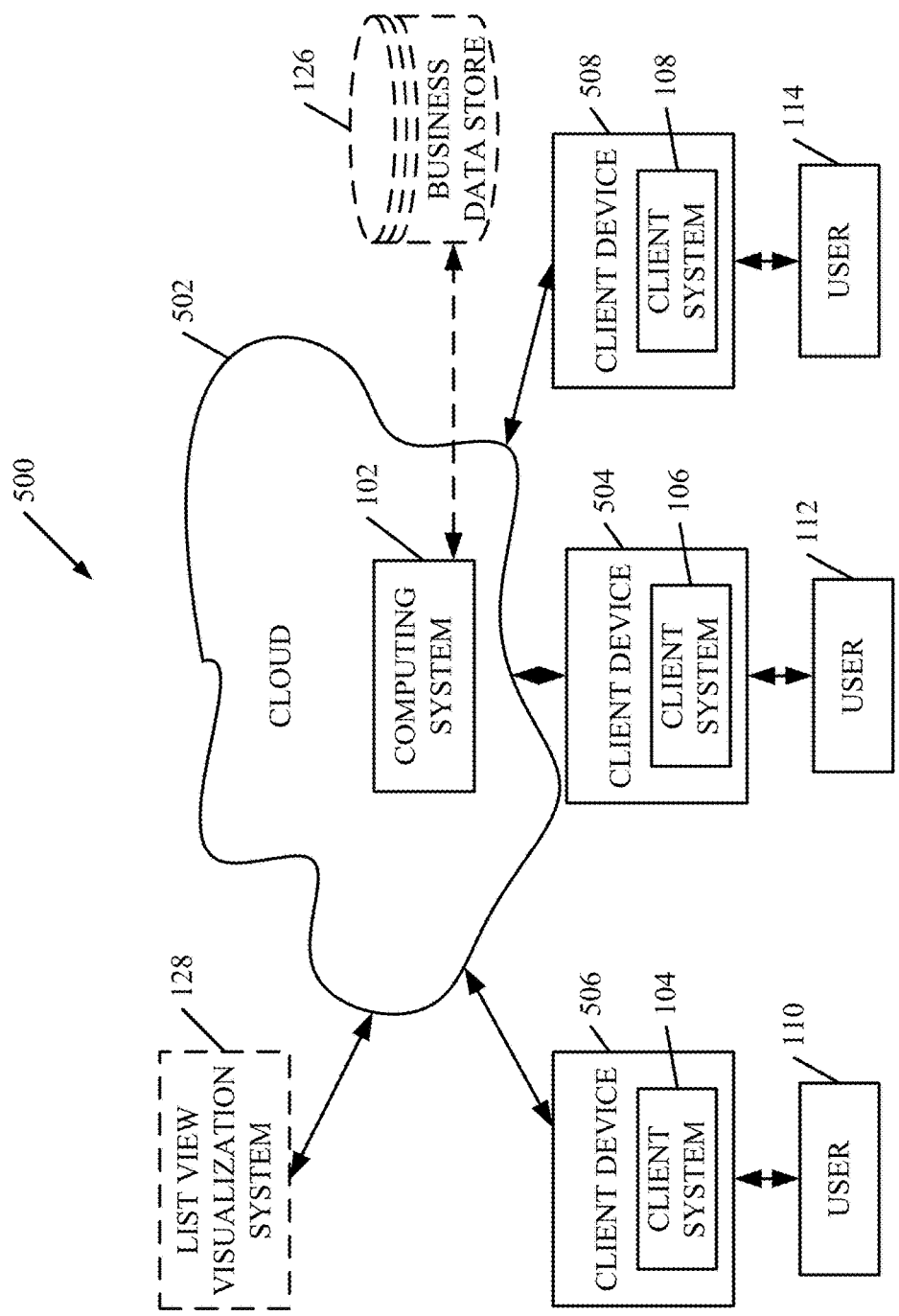
FIG. 5 shows one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 110, 112 and 114 use client devices 504, 506 and 508 to access those systems through cloud 502.

FIG. 5 also depicts another example of a cloud architecture. FIG. 5 shows that it is also contemplated that some elements of architecture 100 can be disposed in cloud 502 while others are not. By way of example, data store 126 can be disposed outside of cloud 502, and accessed through cloud 502. In another example, list view visualization system 128 can also be outside of cloud 502. Regardless of where they are located, they can be accessed directly by devices 504, 506 and 508 through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
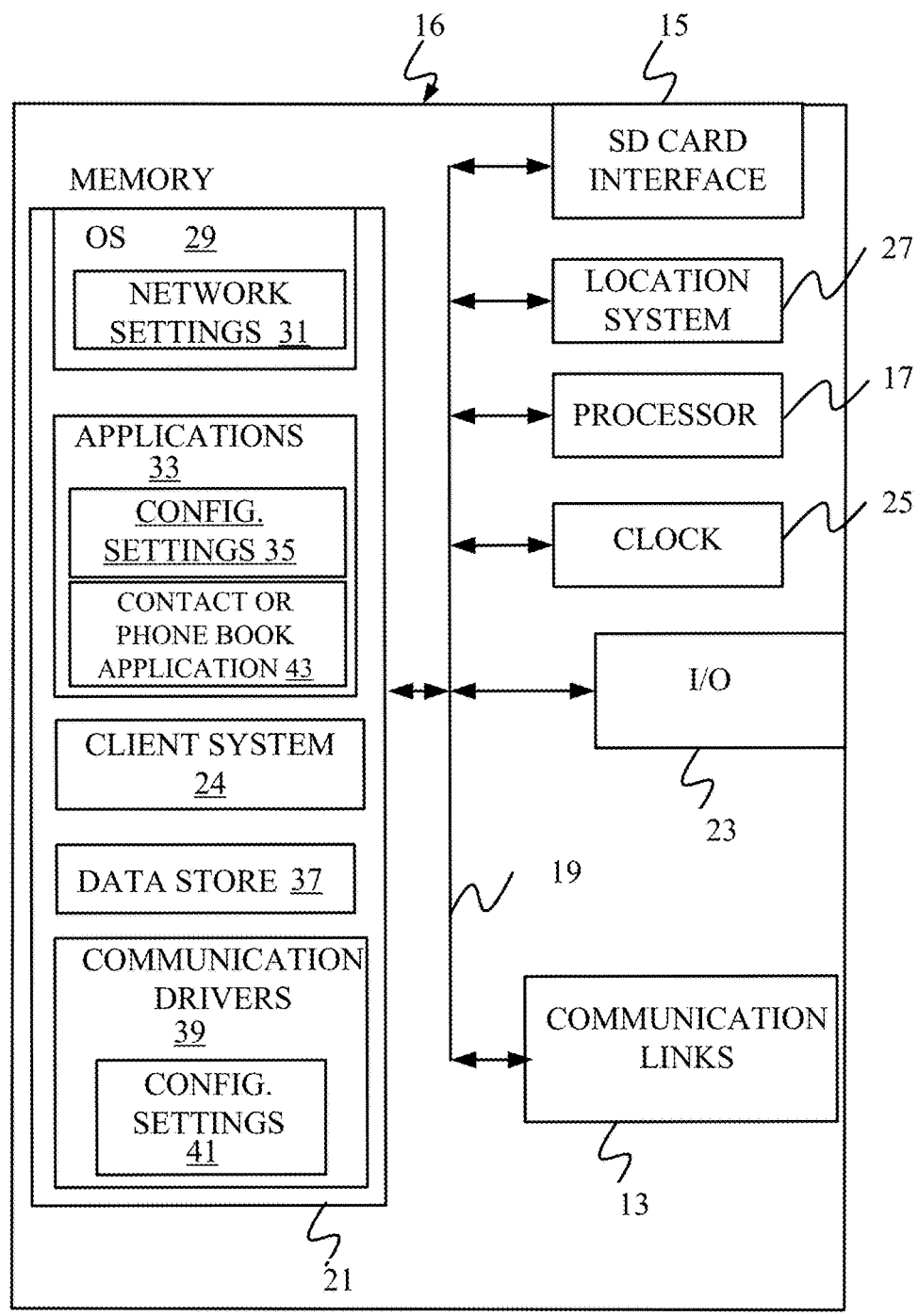
FIGS. 6-8 show examples of mobile devices that can be used in the architectures shown in the previous figures.
Figure 7:
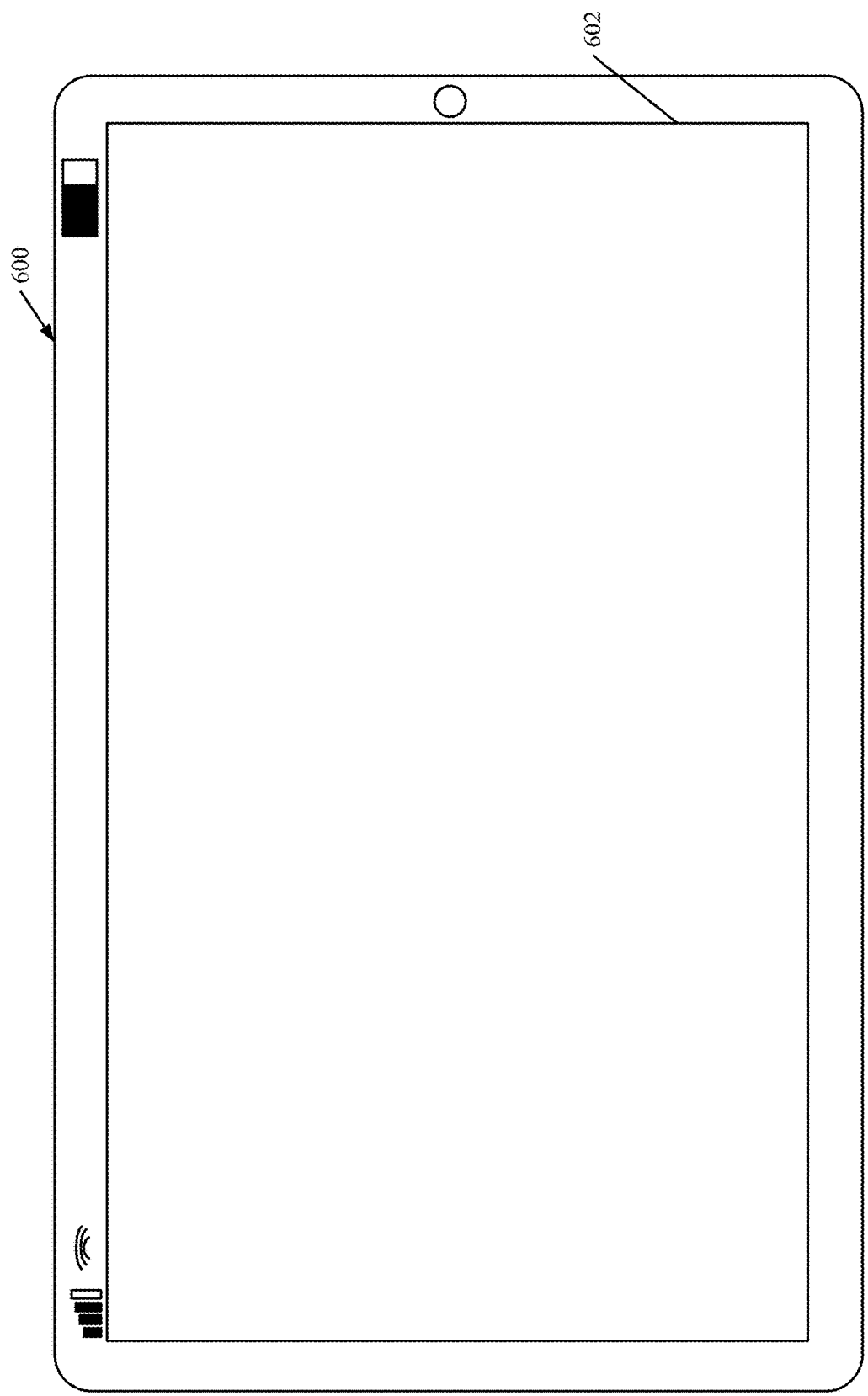
Figure 8:
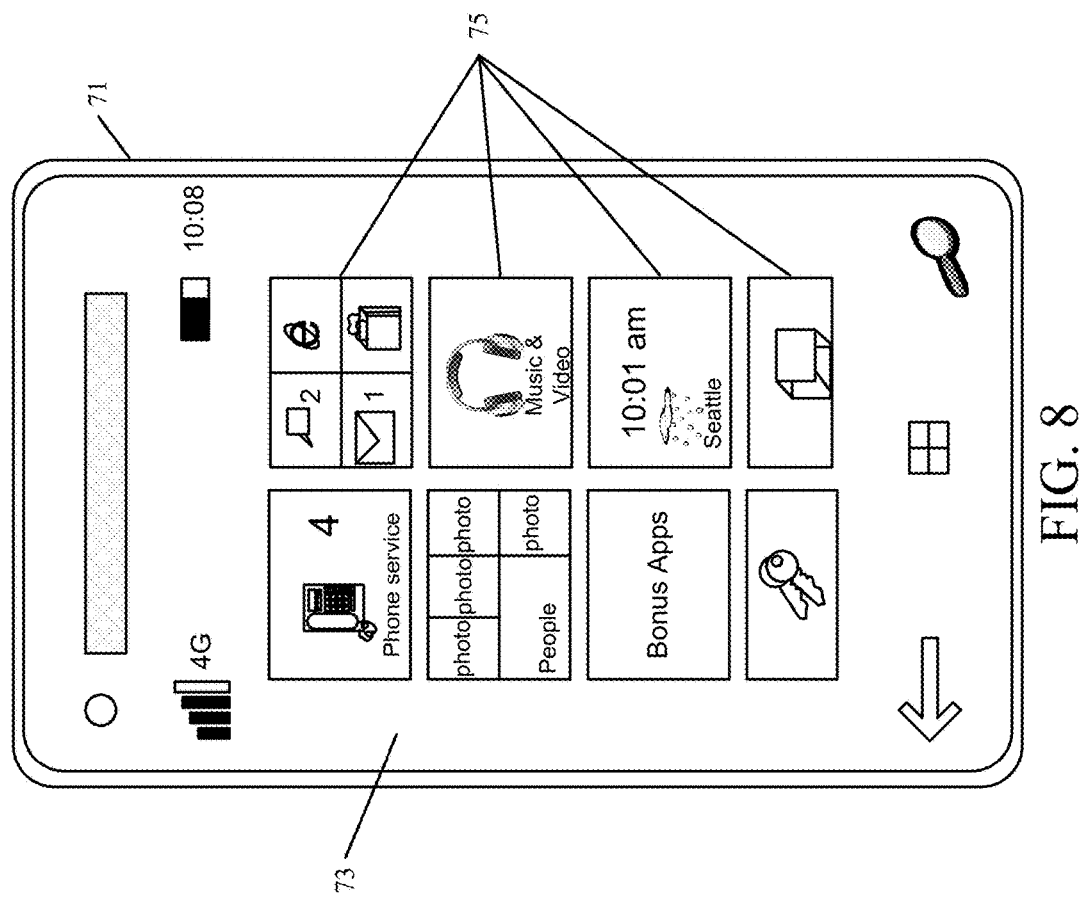

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 (e.g., the client systems) or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 120 or those on the client systems) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of client systems 104, 106 and 108. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
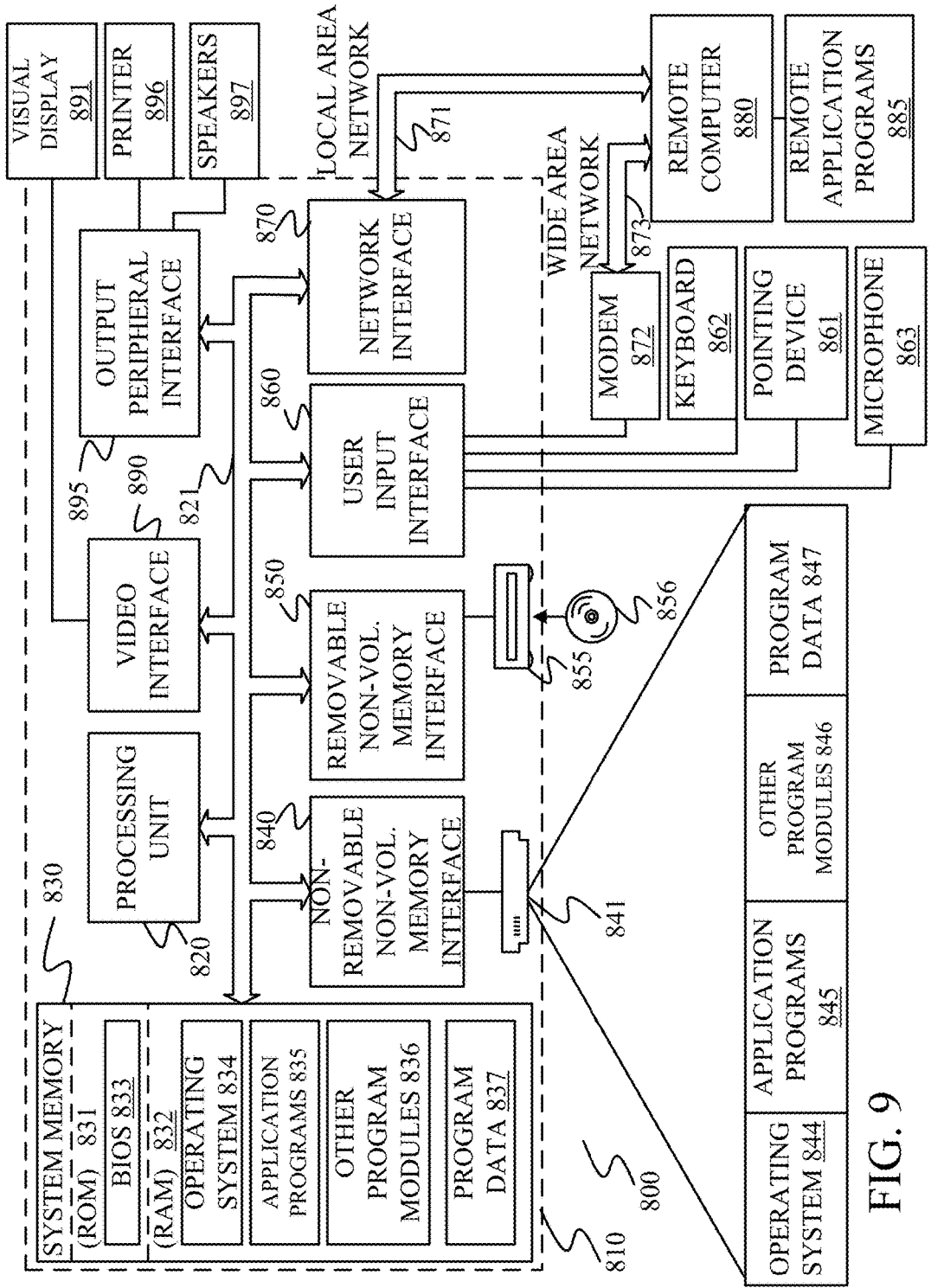
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor or servers 120 or any processors on the client systems), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
an application component that runs an application that surfaces data for user interaction; and
a list view visualization system that generates a list view for visualization of the data in a browser on a client device, the list view having a header portion and a data content portion, the list view visualization system including a navigation system that detects user scrolling interactions with the list view and controls the list view to perform a scrolling operation that scrolls data that is visible in the data content portion of the list view while freezing the header portion.

Example 2 is the computing system of any or all previous examples wherein the data content portion of the list view has rows divided into columns at column boundaries and wherein the header portion of the list view comprises row header information indicating a header for each of the rows, the list view visualization system controls the list view to snap to a column boundary when finishing the scrolling operation.

Example 3 is the computing system of any or all previous examples wherein the list view visualization system comprises:
a column visibility toggling component that toggles a visibility property of each column as it scrolls into and out of visibility in the data content portion of the list view; and
a column width animation component that animates a width property of each column as it transitions from being visible to being invisible, based on the visibility property being toggled by the visibility toggling component.

Example 4 is the computing system of any or all previous examples wherein the navigation system comprises:
a synchronization component that synchronizes the scrolling operation with the user scrolling interactions.

Example 5 is the computing system of any or all previous examples wherein the navigation system comprises:
a scroll bar generator that generates a scroll bar as a separate container from the header portion and the data content portion of the list view.

Example 6 is the computing system of any or all previous examples wherein the list view visualization system detects the user scrolling interaction as user manipulation of the scroll bar.

Example 7 is the computing system of any or all previous examples wherein the list view visualization system detects the user scrolling interactions as a touch gesture.

Example 8 is the computing system of any or all previous examples wherein the browser includes native scrolling functionality and wherein the list view visualization system provides an output that disables the native scrolling functionality on the browser.

Example 9 is the computing system of any or all previous examples and further comprising:
a dynamic adjustment component that generates user input mechanisms that are actuated to adjust the header portion that is frozen during the scrolling operation.

Example 10 is a computer implemented method, comprising:
running an application that surfaces data for user interaction;
detecting a user interaction requesting visualization of the data in a list view on a browser on a client device;
generating the list view having a header portion and a data content portion;
detecting user scrolling interactions with the list view; and
controlling the list view to perform a scrolling operation that scrolls data that is visible in the data content portion of the list view while freezing the header portion.

Example 11 is the computer implemented method of any or all previous examples wherein generating the list view with a header portion and a data content portion comprises:
generating the data content portion of the list view with rows divided into columns at column boundaries; and
generating the header portion of the list view with row header information indicating a header for each of the rows.

Example 12 is the computer implemented method of any or all previous examples wherein controlling the list view to perform a scrolling operation comprises:
controlling the list view to snap to a column boundary when finishing the scrolling operation.

Example 13 is the computer implemented method of any or all previous examples wherein controlling the list view to snap to a column boundary comprises:
toggling a visibility property of each column as it scrolls into and out of visibility in the data content portion of the list view; and
animating a width property of each column as it transitions from being visible to being invisible, based on the visibility property being toggled.

Example 14 is the computer implemented method of any or all previous examples and further comprising:
synchronizing the scrolling operation with the user scrolling interactions.

Example 15 is the computer implemented method of any or all previous examples wherein synchronizing comprises:
generating a scroll bar as a separate container from the header portion and the data content portion of the list view;

detecting the user scrolling interaction as user manipulation of the scroll bar; and
synchronizing the user manipulation of the scroll bar with the scrolling operation.

Example 16 is the computer implemented method of any or all previous examples wherein synchronizing comprises:
detecting the user scrolling interactions as a touch gesture; and
synchronizing the touch gesture with the scrolling operation.

Example 17 is the computer implemented method of any or all previous examples wherein the browser includes native scrolling functionality and further comprising:
prior to controlling the list view to perform the scrolling operation, disabling the native scrolling functionality on the browser.

Example 18 is a computing device, comprising:
an application component that runs an application that surfaces data for user interaction; and
a list view visualization system that generates a list view for visualization of the data in a browser on a client device, the list view having a header portion and a data content portion, the data content portion of the list view having rows divided into columns at column boundaries and wherein the header portion of the list view comprises row header information indicating a header for each of the rows, the list view visualization system including a navigation system that detects user scrolling interactions with the list view and controls the list view to perform a scrolling operation that scrolls columns that are visible in the data content portion of the list view while freezing the header portion, the list view visualization system controlling the list view to snap to a column boundary when finishing the scrolling operation.

Example 19 is the computing system of any or all previous examples wherein the list view visualization system comprises:
a column visibility toggling component that toggles a visibility property of each column as it scrolls into and out of visibility in the data content portion of the list view; and
a column width animation component that animates a width property of each column as it transitions from being visible to being invisible, based on the visibility property being toggled by the visibility toggling component.

Example 20 is the computing system of any or all previous examples and further comprising:
a synchronization component that synchronizes the scrolling operation with the user scrolling interactions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
a processor; and
memory storing instructions executable by the processor, wherein the instructions, when executed, configure the computing system to provide:
an application component configured to run an application; and
a list view visualization system configured to:
generate a representation of a list view for visualization of data in a browser on a client device, the data being associated with the application and comprising rows divided into a plurality of columns at column boundaries, the list view having
a data content portion comprising first and second columns of the plurality of columns,
a header portion comprising row header information that includes at least one other column, of the plurality of columns, and indicates a header for each of the rows;
a scrolling control user interface (UI) element; and
based on an indication of user actuation of the scrolling control UI element, perform a scrolling operation that:
determines that the browser includes native scrolling functionality,
generates a disable instruction that disables the native scrolling functionality of the browser,
scrolls the first column in the data content portion of the list view towards the header portion while freezing the header portion such that the header portion maintains visibility during the scrolling operation, and
based on detecting that a portion of the first column crosses a boundary of the header portion,
automatically toggles a visibility property of the first column to indicate that the first column is not visible in the list view,
automatically toggles a visibility property of a third column, that was not visible in the data content portion prior to performing the scrolling operation, to add the third column as visible in the list view, and
automatically modifies a position of the second column such that a boundary of the second column is aligned with the boundary of the header portion.

2. The computing system of claim 1 wherein the list view visualization system is configured to:
modify the position of the second column by generating an animation of a width property of the first and second columns, respectively, as the first column transitions from being visible to being not visible, based on the visibility property being toggled.

3. The computing system of claim 1 wherein the scrolling control UI element comprises a scroll bar as a separate container from the header portion and the data content portion.

4. The computing system of claim 3 wherein the indication of the user interaction with the scrolling control UI element comprises an indication of a user manipulation of the scroll bar that manipulates the scroll bar away from the header portion.

5. The computing system of claim 4 wherein, the list view visualization system is configured to:
synchronize the scrolling operation, including the toggling of the visibility property of the first column and the modifying of the position of the second column, with the user manipulation of the scroll bar.

6. The computing system of claim 1 wherein the indication of the user interaction with the scrolling control UI element comprises an indication of a touch gesture.

7. The computing system of claim 1 and further comprising:
a dynamic adjustment component configured to:
generate a representation of an adjustment user input mechanism; and based on an indication of user actuation of the adjustment user input mechanism, adjust the header portion that is frozen during the scrolling operation.

8. The computing system of claim 1, wherein the list view visualization system is configured to:
automatically modify the position of the second column by applying a cascading style sheet transition on a width parameter of the second column.

9. A computer implemented method, comprising:
generating a representation of a list view for visualization of data in a browser on a client device, the data being associated with an application and comprising rows divided into a plurality of columns at column boundaries,
the list view having
a data content portion comprising first and second columns of the plurality of columns,
a header portion comprising row header information that includes at least one other column, of the plurality of columns, and indicates a header for each of the rows;
a scrolling control user interface (UI) element; and
based on an indication of user actuation of the scrolling control UI element, performing a scrolling operation that comprises:
determining that the browser includes a native scrolling functionality,
generating a disable instruction that disables the native scrolling functionality of the browser,
scrolling the first column in the data content portion towards the header portion while freezing the header portion, wherein freezing the header portion maintains visibility of the header portion during the scrolling operation, and
based on detecting that a portion of the first column crosses a boundary of the header portion during the scrolling operation,
automatically toggling a visibility property of the first column to indicate that the first column is not visible in the list view,
automatically toggling a visibility property of a third column to indicate that the third column is visible in the data content portion of the list view, wherein the third column, prior to performing the scrolling operation, was not visible in the data content portion of the list view, and
automatically modifying a position of the second column such that a boundary of the second column is aligned with the boundary of the header portion.

10. The computer implemented method of claim 9 wherein performing a scrolling operation comprises:
controlling the boundary of the second column to visually snap to the boundary of the header portion when finishing the scrolling operation.

11. The computer implemented method of claim 10 wherein controlling the boundary of the second column to visually snap to the boundary of the header portion comprises:
animating a width property of the first and second columns, respectively, as the first column transitions from being visible to being invisible, based on the visibility property being automatically toggled.

12. The computer implemented method of claim 9 and further comprising:
synchronizing the scrolling operation with the user interaction with the list view.

13. The computer implemented method of claim 12, wherein the scrolling control UI element comprises a scroll bar as a separate container from the header portion and the data content portion, and wherein synchronizing comprises:
identifying the user interaction as a user manipulation of the scroll bar; and
synchronizing the user manipulation of the scroll bar with the scrolling operation.

14. The computer implemented method of claim 13 wherein synchronizing comprises:
determining that the user interaction is indicative of a touch gesture that moves the scroll bar away from the header portion; and
synchronizing the touch gesture with the scrolling operation.

15. A computing system, comprising:
a processor; and
memory storing instructions executable by the processor, wherein the instructions, when executed, configure the computing system to:
run an application; and
generate a representation of a list view for visualization of application data in a browser on a client device, the list view comprising rows divided into a plurality of columns at column boundaries and having
a data content portion comprising first and second columns of the plurality of columns, and
a header portion comprising row header information that includes at least one other column, of the plurality of columns, and indicates a header for each of the rows; and
based on an indication of a user interaction with a scroll bar that is a separate container from the data content portion and the header portion, perform a scrolling operation that
determines that the browser on the client device includes a native scrolling functionality,
disables the native scrolling functionality of the browser,
scrolls the first and second columns in the data content portion towards the header portion while freezing the header portion to maintain visibility of the row header information,
based on a determination that a portion of the first column crosses a boundary of the header portion during the scrolling operation,
automatically toggles a visibility property of the first column to remove the first column from being visible in the list view,
automatically toggles a visibility property of a third column, that was not visible in the data content portion of the list view prior to performing the scrolling operation, to add the third column as being visible in the list view, and
automatically modifies a position of the second column by performing a width animation that visually snaps a boundary of the second column to the boundary of the header portion.

16. The computing system of claim 15 wherein the list view visualization system is configured to perform the scrolling operation that:
based on a determination that a portion of the first column crosses a boundary of the header portion,
automatically modifies a position of the third column by performing a width animation that visually snaps a boundary of the third column to a boundary of the second column, in the data content portion of the list view.

17. The computing system of claim 15 and further comprising:
a synchronization component configured to synchronize the scrolling operation with the user interaction with the scroll bar.

* * * * *